Dec. 5, 1961  HENRI-GEORGES DOLL  3,012,189
CAPACITIVE DETECTOR
Filed June 5, 1945

INVENTOR.
HENRI-GEORGES DOLL
BY Hoguet, Neary & Campbell
ATTORNEYS

3,012,189
CAPACITIVE DETECTOR
Henri-Georges Doll, Houston, Tex., assignor to Electro-Mechanical Research, Inc., Houston, Tex., a corporation of Texas
Filed June 5, 1945, Ser. No. 597,680
6 Claims. (Cl. 324—40)

This invention relates to apparatus and to methods for detecting the presence of foreign objects in media having different electrical properties. It relates particularly to apparatus and methods for detecting land mines.

A mine detector of the type used heretofore consists essentially of an alternating current bridge network having a transmitting coil that is energized by an oscillator to set up eddy currents in the earth. The bridge network is also provided with a detecting or receiving coil for picking up signals caused by the presence of a mine, an amplifier for amplifying the signals, and an indicator such as a headphone or meter for indicating the presence of the mine.

When homogeneous earth is energized by means of an inductive transmitter of the type described generally above, the density of the induced current is proportional to the conductivity of the earth and objects present in the earth. The presence of a nonmetallic, buried mine in the vicinity of the transmitter results in a distorted geometrical arrangement of the lines of current in the ground and in the corresponding magnetic field. This geometrical distortion is independent of the conductivity of the earth and depends only on the geometrical dimensions of the buried mine and on its position with respect to the transmitter and to the surface of the earth. The intensity of the alternating current field is proportional to the conductivity of the earth and the objects therein.

If an inductive pickup like that described above is used, that is, if the distortion in the magnetic field is detected inductively by means of a receiving coil, the signal produced in this coil is a function of the amount of geometrical distortion of the field, and for the same distortion, it is proportional to the intensity of the field, and to the conductivity of the ground. If this conductivity is high, for example, in damp earth, the signal produced by a metallic or a nonmetallic mine is easy to detect. If, on the contrary, the conductivity of the earth is low, such as, for example, when the earth is dry, the signal produced by a nonmetallic mine is too small to be easily measured or detected.

The inductive type of mine detector can, of course, be made sufficiently sensitive to detect nonmetallic mines even in relatively dry earth, but the increase in sensitivity renders the mine detector undependable for the reason that it is rendered sensitive also to very small particles of metal such as shell fragments and the like.

An object of the present invention is to provide an apparatus and a method of detecting metallic and nonmetallic mines which is not dependent upon the conductivity of the earth.

Another object of the invention is to provide a mine detector and a method of detecting mines in which indications of the presence of the mines can be obtained by detecting, by capacity, the voltages developed in the earth by the mines.

In a typical form of apparatus and method embodying the present invention, eddy currents are induced in the earth by means of a coil which is energized by an oscillator. Geometrical distortions in the field set up by the coil are detected by means of suitable electrodes in spaced relation to the earth that pick up the ground potential differences by capacity.

The device operates on a somewhat different principle than the prior type of mine detector described above, inasmuch as the capacity is not dependent on the absolute conductivity of the soil, and the relative dryness or dampness of the earth is not important. Thus, for example, when eddy currents are induced in homogeneous earth by means of a horizontal, circular coil, the eddy currents are everywhere symmetrical with respect to the coil. Under these conditions, voltages are not produced in the earth because the ohmic drop in the earth is everywhere exactly equal to the electro-motive force produced by the magnetic field of the coil. A condition, therefore, exists in which eddy currents flow but no voltage results.

When the homogeneity of the soil is disturbed by the presence of a buried object that has a conductivity different from that of the earth, the eddy currents flow around it or through it and they are no longer symmetrical thereby causing voltages to appear at the surface of the earth. These voltages are a function of the ratio of the soil conductivity to the conductivity of the buried object and are independent of the absolute conductivity of the soil. These voltages can be picked up by the use of suitable electrodes and thus indicate the presence of a foreign object in the soil.

The transmitter coil induces a relatively constant E.M.F. in the earth which in turn causes eddy currents to flow. If the earth is very conductive, these currents are relatively large. If the earth is resistive, these currents are relatively small. The large currents flowing through the small resistance of the conductive earth and the small currents flowing through the high resistance of the resistive earth yield approximately the same ohmic drop of potential. Since it is this potential which actuates the detector, this novel method of detecting buried mines is not dependent upon the conductivity of the earth.

For a better understanding of the present invention, reference may be had to the accompanying drawings in which.

Figure 1:
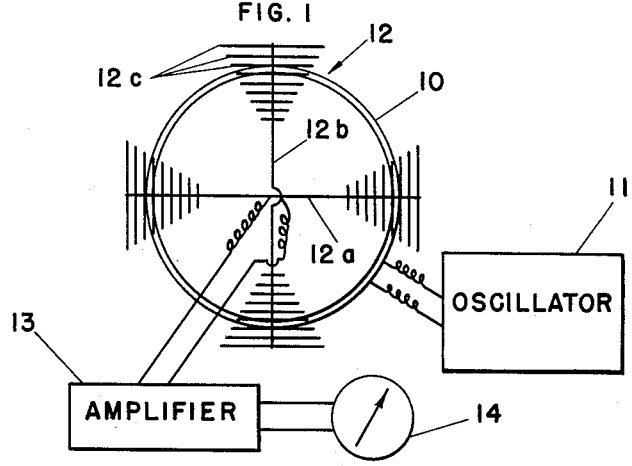
FIGURE 1 is a schematic and block diagram of a typical form of mine detecting apparatus embodying the present invention.

The form of mine detecting apparatus disclosed in the drawings may include a transmitting coil 10 which is energized at a suitable frequency by means of an oscillator 11. The coil preferably is circular in shape and kept pararallel to the surface of the ground so that the eddy current field produced in the earth is symmetrical.

Adjacent the coil 10 and mounted on a support common to the coil 10 is a symmetrical electrode system 12 which is used for picking up the signals produced by the presence of a mine or other object in the earth. As best shown in FIGURE 1, the electrode system 12 may consist of two separate, angularly related conducting rods 12a and 12b extending at substantially a right angle and crossing at the axis of the coil 10. Each of the rods 12a and 12b is provided with a plurality of parallel conductors 12c lying in substantially a common plane and extending at about a right angle to the supporting rod 12a or 12b. The two angularly related rods 12a, 12b are connected at their mid-points to the input terminals of an amplifier 13, the output terminals of which are connected to an indicating device such as the meter 14 or a set of headphones.

Figure 2:
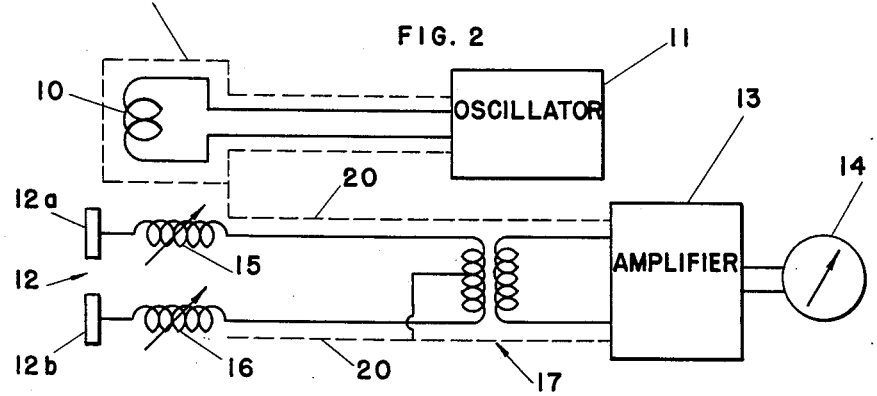
FIGURE 2 is a schematic and block diagram disclosing the electrical circuit of the mine detecting apparatus.

The electrode system 12 may be balanced to have substantially zero mutual impedance with respect to the coil 10 by means of the variable inductances 15 and 16 connected between each electrode and the amplifier. Also, the electrode system 12 may be inductively coupled to the amplifier 13 through a transformer 17 as illustrated in FIGURE 2.

Figure 3:
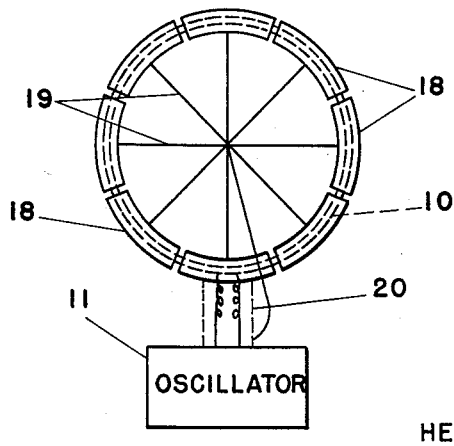
FIGURE 3 is a plan view of a transmitting coil for the apparatus disclosing a shielding system for the coil.

In order to render the electrode system 12 effective, it is necessary to provide efficient shielding means between the coil and the electrodes 12. FIGURE 3 discloses a suitable electrostatic shielding for the coil 10. The coil may be mounted within a plurality of arcuate, conductive tubular or channel elements 18. As illustrated, the tubular elements 18 are of equal size and eight are provided for shielding a typical coil. These tubular shielding elements 18 are connected by means of radially extending conductors 19 of equal length, the inner ends of which are connected to the armor or shield 20 for the conductors between the coil 10 and the oscillator and the electrode system 12 and the amplifier. The shields 20 may be grounded to the mid-point of the transformer 17. Inasmuch as the shielding elements 18 and the connecting wires 19 are symmetrically disposed with respect to the axis of the coil, the electro-motive forces induced therein will be in opposition and will have no effect on the electrode system 12.

The efficiency of the shield may be improved by increasing the number of the segments 18 and of the connecting wires 19. The most efficient shield would be one that is made up of a large number of radially extending wires and shield elements or in which the segments 18 are formed of a plurality of C-shaped wires connected to a common circumferentially extending conductor. The arrangement illustrated in FIGURE 3 is, however, quite satisfactory for use in detecting mines.

In operation, the transmitting coil and the electrodes are moved substantially parallel to the surface of the earth. With the system so balanced that no signal is produced when the transmitting coil 10 and electrodes 12 are over homogeneous earth, the presence of a foreign object such as a metallic or non-metallic mine will cause a signal to be produced in the capacity electrode system 12 because of the voltage developed in the earth by the presence of the mine. This signal is amplified in the amplifier and indicated by an audible signal in the headphone or by deflection of the pointer of the indicator 14 as disclosed.

The above described apparatus and method are satisfactory for the detection of metallic and non-metallic mines without being so sensitive as to be affected by the presence of small particles of metal and other foreign objects in the soil. Preferably, the frequency of the oscillator used should be relatively high, that is, on the order of a few megacycles or higher in order to avoid disturbing influences produced by electro-motive forces generated by induction in the weeds and other objects projecting above the surface of the earth in the vicinity of the electrode system 12.

It will be understood that the oscillator and transmitting coil arrangement, as well as the structural details of the pickup electrodes 12 may be modified considerably without departing from the invention. For example, each electrode may be formed of a single wire or piece of metal bent into a flat sinuous shape, and the coil 10 and the electrode system 12 may be mounted on a handle or, if desired, on a carriage having wheels thereon to permit it to be moved parallel to the earth.

Therefore, the form of the invention disclosed herein should be considered as illustrative and not as limiting the scope of the following claims.

I claim:

1. An apparatus for detecting foreign objects in a medium, comprising a ring-like transmitting coil adapted to be moved in spaced relation to, and with its axis substantially perpendicular to the surface of said medium, an oscillator connected to said coil for energizing the latter to create eddy currents in said medium, and means including electrodes mounted adjacent said coil in substantially parallel fixed relationship with the plane of said coil and moveable therewith for obtaining indications, by capacity, of voltages developed in said medium by the presence of a foreign object, said electrodes being spaced apart along the direction of eddy current flow in the medium when said coil is disposed in spaced relation to said medium.

2. An apparatus for detecting foreign objects in a medium which comprises a ring-like transmitting coil adapted to be moved in spaced relation to, and with its axis substantially perpendicular to the surface of said medium, an oscillator connected to said coil for energizing the latter to create eddy currents in said medium, and means including electrodes mounted adjacent said coil and disposed symmetrically about the axis thereof in substantially parallel fixed relationship with respect to the plane thereof and movable with said coil for obtaining indications, by capacity, of voltages developed in said medium by the presence of a foreign object, said electrodes being spaced apart along the direction of eddy current flow in the medium when said coil is disposed in spaced relation to said medium.

3. An apparatus for detecting foreign objects in a medium which comprises a ring-like transmitting coil adapted to be moved relatively to, and with its axis substantially perpendicular to the surface of said medium, an oscillator connected to said coil for energizing said coil to create eddy currents in said medium, electrostatic shielding means around said coil, a pair of angularly related capacitative electrodes mounted adjacent said coil and disposed symmetrically about the axis thereof in fixed, parallel relationship to the plane thereof said electrodes being spaced apart along the direction of eddy current flow in the medium when said coil is disposed in spaced relation to said medium, and means connected with said electrodes for providing indications of voltages developed in said medium by the presence of a foreign object in said medium.

4. An apparatus for detecting foreign objects in a medium which comprises a ring-like transmitting coil adapted to be moved relatively to, and with its axis substantially perpendicular to the surface of said medium, an oscillator connected to said coil for energizing said coil to create eddy currents in said medium, a pair of angularly related, flat, brush-like, capacitance electrodes mounted adjacent said coil and in fixed parallel relationship to the plane thereof and disposed symmetrically about the axis thereof, said electrodes being spaced apart along the direction of eddy current flow in the medium when said coil is disposed in spaced relation to said medium, electrostatic shielding means between said coil and said electrodes, and means connected with said electrodes for providing indications of voltages developed in said medium by the presence of a foreign object in said medium.

5. An apparatus for detecting foreign objects in a medium which comprises a ring-like transmitting coil adapted to be moved in relatively closely spaced relation to, and with its axis substantially perpendicular to the surface of said medium, an oscillator connected to said coil for energizing the latter to create eddy currents in said medium, means including electrodes mounted adjacent said coil in substantially parallel fixed relationship with the plane thereof and movable therewith for obtaining indications, by capacity, of voltages developed in said medium by the presence of a foreign object, said electrodes being spaced apart along the direction of eddy current flow in the medium when said coil is disposed in spaced relation to said medium, and electrostatic shielding means between said coil and said electrodes.

6. An apparatus for detecting foreign objects in a medium, comprising a ring-like transmitting coil adapted to be moved relatively to, and with its axis substantially perpendicular to the surface of said medium, an oscillator connected to said coil for energizing the latter to create eddy currents in said medium, a pair of angularly related brush-like electrodes fixedly mounted on said coil in parallel relationship to the plane thereof and symmetrically disposed with respect to the axis thereof for detecting by capacity potentials developed in said medium by inhomogeneities therein, said electrodes being spaced apart along the direction of eddy current flow in the medium when said coil is disposed in spaced relation to said medium, an amplifier having its input connected to said electrodes, and indicating means connected to said amplifier.

References Cited in the file of this patent

UNITED STATES PATENTS

| | | |
|---|---|---|
| 1,678,489 | Sundberg | July 24, 1928 |
| 1,792,910 | Jakosky | Feb. 17, 1931 |
| 1,934,447 | Ricker | Nov. 7, 1933 |
| 2,160,356 | Fore | May 30, 1939 |

FOREIGN PATENTS

| | | |
|---|---|---|
| 398,267 | Germany | July 5, 1924 |